Patented June 19, 1951

2,557,802

UNITED STATES PATENT OFFICE 2,557,802

ORGANOSILYL ALKYL AMINES AND THEIR HYDROCHLORIDES

Leo Harry Sommer, State College, Pa., assignor to Dow Corning Corporation, Midland, Mich., a corporation of Michigan No Drawing. Application April 13, 1950,
Serial No. 155,783

6 Claims. (Cl. 260—448.2)

The present invention relates to alkyl amines and their hydrochlorides which are omega-substituted with triorganosilyl radicals and to methods for their production.

Compositions in accordance herewith are of the general formula $R(CH_3)_2Si(CH_2)_nNH_2(HCl)_s$ where R represents methyl or phenyl, $n$ has an average value of from 2 to 5, inclusive, and $s$ has a whole value from 0 to 1, inclusive.

In accordance herewith these compounds may be prepared by molecular dehydration of an amide of the general formula $$R(CH_3)_2Si(CH_2)_mCONH_2$$

where $m$ has an average value of from 2 to 4, inclusive. From this dehydration compounds of the general formula $R(CH_3)_2Si(CH_2)_mCN$ are obtained. These nitriles may then be reduced by any appropriate method, such as by the use of lithium aluminum hydride, to the corresponding amine of the general formula stated above. This method is of particular utility for the production of those amines where $n$ has a value of 3 to 5, inclusive.

An alternative method in accordance herewith involves the preparation of the amines hereof from the amides above stated in which $m$ has a value of from 2 to 5, inclusive, by employment of the Hofmann synthesis. In this method the amide is reacted with sodium methylate and bromine in methanol solution. By this procedure the equivalent urethane is obtained. As is known, in the Hofmann synthesis a rearrangement occurs in which the carboxyl carbon is replaced by nitrogen on the alkyl chain. The urethane is then hydrolyzed, whereby the amine is obtained.

Both of the above methods are classical synthetic methods as applied to organic chemistry generally and may be found in standard texts.

In the following description of methods for the preparation of raw materials, the terms "triorganosilyl" and "triorganosilane" are employed to refer collectively to trimethylsilyl and phenyldimethylsilyl, and trimethylsilane and phenyldimethylsilane, respectively.

In both of the above methods the omega-triorganosilyl-substituted propionic to hexoic acids are necessary intermediates. These acids may be prepared as follows:

For the preparation of the silyl-substituted propionic acid, chloromethyltrimethylsilane and chloromethyldimethylphenylsilane may be employed as raw materials. These two raw materials are described in the literature. These chloromethylsilanes may be subjected to the malonic ester synthesis, which is a general synthetic method known in organic chemistry. As applied to the present synthesis, the chloromethylsilane is reacted with an equivalent weight of the sodium salt of diethyl malonate. The reaction product is saponified, hydrolyzed, and decarboxylated, as is known in this type of synthesis. The product is the omega-triorganosilylpropionic acid.

To prepare the triorganosilylbutyric acid, the chloromethylsilanes may be reacted with an equivalent weight of magnesium in diethyl ether to prepare the Grignard reagent. This may be reacted with ethylene oxide. By this method there is obtained the omega-triorganosilylpropanol. This substituted propanol may be converted by reacting it with an equivalent weight of phosphorous tribromide to the omega-triorganosilylpropyl bromide. This substituted propyl bromide may be reacted with an equivalent weight of magnesium in diethyl ether to prepare the equivalent Grignard reagent. This Grignard reagent is then reacted with carbon dioxide, as by pouring it on solid carbon dioxide, to form a complex which upon hydrolysis with water yields the triorganosilylbutyric acid.

The triorganosilylvaleric acid may be prepared from the triorganosilylpropyl bromide prepared as above described. When the malonic ester synthesis above described is employed with this substituted propyl bromide, the triorganosilylvaleric acid is obtained.

The omega-triorganosilylhexoic acid may be prepared from the above-described triorganosilylpropyl bromide by preparing a Grignard reagent of this bromide and reacting this Grignard reagent with ethylene oxide. By this method the omega-substituted triorganosilylamyl alcohol is produced. This may be converted to the bromide by reacting it with an equivalent weight of thionyl bromide. A Grignard reagent is prepared from this substituted amyl bromide, which Grignard reagent is then reacted with carbon dioxide by the method above stated to yield a complex, which upon hydrolysis with water produces the omega-triorganosilylhexoic acid.

The above-described acids may be converted to the equivalent acyl halides by reacting them with an equivalent weight of any conventional halogenating agent, such as thionyl chloride, benzoyl chloride, phosphorous trichloride, or the corresponding bromides.

The acyl halides are reacted with liquid ammonia. Very vigorous reaction is obtained upon mixture of the ammonia and the acyl halide. Purely to suppress the reaction and avoid an unduly high rate of reaction in order to prevent loss of ammonia, it is desirable to conduct the reaction at low temperatures, such as below 0° C. The reaction forms ammonium halide as a by-product. The amide produced may be separated from the ammonium halide. This may be effected by dissolving the amide in any conventional solvent in which amides are soluble and in which ammonium halides are insoluble, for example, diethyl ether. The amide may then be recovered from the solution.

In the preparation of the amines hereof from the amides so prepared by the method in which the nitrile is an intermediate, the amide is first dehydrated. This dehydration may suitably be accomplished by heating the amide with phosphorous pentoxide. The nitrile so formed may be separated from the phosphorous acid, which is by-produced, by distillation either at atmospheric pressure or under reduced pressure. Various methods are known for the reduction of nitriles. The use of lithium aluminum hydride is preferred, however. By this method the primary amines are formed in large yield. When lithium aluminum hydride is employed, a nitrogen metallate compound is produced, which may then be hydrolyzed with water to yield the desired amine.

In the Hofman synthesis for the amines from the amides, an amide of the formula $R'CONH_2$ is reacted with sodium metallate and bromine in methanol solution. The Hofmann synthesis is a degradation which by this reaction yields a urethane of the formula $R'NHCOOCH_3$. The urethane is then decomposed, as by alcoholic potassium hydroxide, to yield the amine of the formula $R'NH_2$, which will be present in alcoholic solution. When the above-described amides are employed, the amines produced are of the formula $R(CH_3)_2Si(CH_2)_nNH_2$. The alcohol may then be removed by distillation and the amine steam-distilled from the residue. To separate the amine from any water and residual alcohol, the hydrochloride may be formed, which hydrochloride is non-volatile. The residual water and alcohol may then be removed by distillation, leaving a purified amine hydrochloride.

As is well known in the chemistry of amines and their hydrochlorides, the hydrochloride may be prepared from the amine by reaction with hydrogen chloride. Likewise, the amine may be prepared from the hydrochloride by neutralizing the latter with a caustic alkali and distillation of the amine from the residual salt.

By mixing the various organosilicon amines hereof, compositions may be obtained in which the average value of $n$ is fractional and not a whole number.

The amines and the hydrochlorides hereof are of principal utility in the synthesis of other organosilicon derivatives of organic compounds. Thus, they may be converted to quaternary amine salts and employed for such end uses as emulsifying agents for the formation of aqueous emulsions of organosilicon fluids such as dimethylpolysiloxane.

*Example 1*

The compound $(CH_3)_3Si(CH_2)_2NH_2$ and its hydrochloride were prepared as follows:

The sodium salt of diethyl malonate was prepared from sodium ethylate using 200 grams of sodium and from 790 grams of diethyl malonate. The alcoholic solution of the sodium salt was clear and yellow. This sodium salt was reacted with 514.5 grams of chloromethyltrimethylsilane, which was added gradually, with the reaction mixture being heated under reflux. This reaction product was saponified by the addition of 561 grams of potassium hydroxide dissolved in 570 cc. of water, the saponification being effected at room temperature, following which the reaction mixture was refluxed for two and one-half hours. Ethanol was removed by distillation. The potassium salt so formed was hydrolyzed by the addition of one liter of concentrated hydrochloric acid. The reaction mixture was stirred under reflux for five hours, whereby trimethylsilylpropionic acid was formed as an upper layer. This acid boils at 90.5° C. at a pressure of 37 mm. mercury and has a refractive index of $n_D^{20}$ equal to 1.4192.

The beta-trimethylsilylpropionic acid so prepared, in amount of 73 grams, was added gradually at room temperature to 89.3 grams of thionyl chloride. After one-half hour, when the addition was complete, the reaction mixture was heated to 83° C. and maintained at that temperature for three hours. Excess thionyl chloride was removed by flash distillation at 25° C. at a pressure of 4 mm. mercury. The reaction product, which was substantially entirely beta-trimethylsilylpropionyl chloride, was added to a solution of 50 grams of liquid ammonia in 50 cc. of diethyl ether at −70° C. Vigorous reaction occurred, with the formation of ammonium chloride. An additional 150 cc. of ether was added to maintain the slurry in a fluid state. The temperature was raised to room temperature. The solution was removed from the salt by filtration, and the salt was washed with additional ether. The product was crystallized from the ethereal solution by concentrating the solution and then cooling. The trimethylsilylpropionamide product was obtained as transparent plate crystals which had a melting point of 92–93° C.

The methyl urethane of beta-trimethylsilylpropionamide was prepared by reacting 137 grams of said amide with a sodium methylate solution prepared from 540 cc. of anhydrous methanol and 40.5 grams of metallic sodium. Liquid bromine was then added gradually till the amount added was equal to 46 cc. The reaction mixture was heated under reflux for one and one-half hours, following which the reaction product was acidified with glacial acetic acid. The urethane derivative was fractionated to remove methanol, and the remaining material was extracted with ether. Fractionation of the ether extract yielded N-(beta-trimethylsilylethyl)methyl carbamate which has a boiling point of 108° C. at a pressure of 12 mm. mercury, and a refractive index of $n_D^{20}$ equal to 1.4410. This carbamate was hydrolyzed and decarboxylated by reacting it with 240 grams of potassium hydroxide in 400 cc. of methanol, the mixture being heated under reflux for fifteen hours. The methanol was removed by distillation. The remaining material, after removal of the methanol, was steam-distilled. The total distillates were acidified with hydrochloric acid and evaporated to dryness. The residue was beta-trimethylsilylethylamine hydrochloride, which has a melting point of 300° C. and is recrystallizable from a mixture of absolute alcohol and diethyl ether. The amine hydrochloride was neutralized in aqueous solution with an excess of potassium hydroxide over a mole per mole equivalent. The amine was extracted from the reaction mixture with ether and recovered by evaporation of ether from the extract. Beta-trimethylsilylethylamine was thereby obtained, which had a boiling point of 121° C. at atmospheric pressure and a refractive index of $n_D^{20}$ equal to 1.4244. In order to maintain the free amine, it should be held in the absence of carbon dioxide in order to prevent the formation of the carbamate.

*Example 2*

Beta-phenyldimethylsilylethylamine and its hydrochloride may be prepared by the substitution of chloromethylphenyldimethylsilane for chloromethyltrimethylsilane in Example 1. The amine so prepared is a fluid material, and the hydrochloride a crystalline solid.

*Example 3*

Gamma-trimethylsilylpropylamine was prepared as follows:

Chloromethyltrimethylsilane, in amount of 6.8 grams, was mixed with 32.6 grams of magnesium and 25 ml. of diethyl ether. One crystal of iodine was added. When the reaction had started, 184 grams of chloromethyltrimethylsilane dissolved in 550 ml. of diethyl ether was added. The solution was stirred for two hours at 100° C. The solution was cooled to approximately −10° C., whereupon 100 ml. of ethylene oxide dissolved in 125 ml. of diethyl ether were added. The temperature of the mixture was allowed to rise gradually. The ether was then distilled from the reaction mixture and replaced with 750 ml. of benzene. The solution was poured onto one liter of cracked ice, and 250 ml. of concentrated hydrochloric acid were added. The benzene layer was fractionated, whereby gamma-trimethylsilylpropanol was obtained, which has a boiling point of 62° C. at a pressure of 6.2 mm. mercury. Two moles of this product were mixed with one mole of phosphorous tribromide at 0° C. and allowed to stand for 1.5 hours. The reaction mixture was then heated to 85° C. and held at that temperature for nine hours. Excess phosphorous tribromide was decomposed with water. The residue was fractionated, whereby gamma-trimethylsilylpropyl bromide was obtained, which had a boiling point of 67.5° C. at a pressure of 21 mm. mercury. 57.5 grams of this bromide were reacted with 38 grams of magnesium in 100 ml. of diethyl ether and in the presence of one crystal of iodine. When the reaction had started, an additional 500 ml. of the ether and 235 grams of the bromide were added. The mixture was heated under reflux for fifteen hours. The product was poured onto 1500 grams of solid carbon dioxide. A solution of 140 ml. of concentrated hydrochloric acid in one liter of water was added to hydrolyze the product. The product was distilled, whereby $(CH_3)_3Si(CH_2)_3COOH$ was obtained, which had a boiling point of 117.8° C. at a pressure of 100 mm. mercury.

The substituted butyric acid so prepared, in amount of 128 grams, was added gradually at 0° C. to 95 ml. of thionyl chloride. During twenty hours the temperature was gradually raised to 90° C. The reaction product was fractionally distilled, whereby gamma-trimethylsilylbutyryl chloride was obtained, which had a boiling point of 105° C. at a pressure of 57 mm. mercury and a refractive index of $n_D^{20}$ equal to 1.4381. The density at 20° C. was 0.9464.

The gamma-trimethylsilylbutyryl chloride so produced, in amount of 80.3 grams in 65 ml. of diethyl ether, was added to a solution of 85 grams of liquid ammonia in 135 ml. of diethyl ether at −70° C. Excess ammonia was expelled by heating following the reaction. The solid ammonium chloride was removed by filtration. The ether solution was concentrated, whereby the gamma-trimethylsilylbutyramide was obtained in the form of flake crystals. This crude product was recrystallized from heptane, whereby a purified product was obtained which had a melting point of 66.5 to 66.7° C.

The butyramide so prepared was subjected to the Hofmann synthesis described in detail in Example 1. By this synthesis there was prepared gamma-trimethylsilylpropylamine and the hydrochloride thereof. This amine has a boiling point of 145° C. at a pressure of 726 mm. mercury and a refractive index of $n_D^{20}$ equal to 1.4301. The hydrochloride prepared therefrom is a white crystalline solid.

*Example 4*

Gamma-trimethylsilylpropylamine was likewise prepared from beta-trimethylsilylpropionamide, the preparation of which is described in Example 1. The amide so prepared was dehydrated by mixing 82.5 grams thereof with 38.7 grams of phosphorous pentoxide. The system was evacuated to a pressure of 47 mm. of mercury, and the reaction mixture was then heated. A liquid distillate was obtained which was found to be beta-trimethylsilylpropionitrile, which had a boiling point of 94° C. at a pressure of 49 mm. mercury, a refractive index of $n_D^{20}$ equal to 1.4240, and a density at 20° C. equal to 0.8269. A solution of 28.5 grams of lithium aluminum hydride in 1100 cc. of diethyl ether was prepared. To this solution 63.5 grams of the nitrile above described were added, and the mixture was refluxed for twenty hours. At this time the amine metallate had been formed. The solution of the metallate was neutralized by adding 1500 cc. of a 20 per cent aqueous solution of sodium potassium tartrate. Two layers were formed. The aqueous layer contained the inorganic materials, while the ether layer contained the amine. The two layers were separated. The ether was evaporated from the organic layer, leaving the desired gamma-trimethylsilylpropylamine, which had a boiling point of 145° C. at 726 mm. mercury and a refractive index of $n_D^{20}$ equal to 1.4310.

That which is claimed is:

1. Compositions of the group consisting of silanes of the general formula

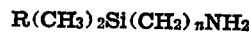

$R(CH_3)_2Si(CH_2)_nNH_2$ in which R represents a radical of the group consisting of methyl and phenyl, n has an average value of from 2 to 5, inclusive; and salts thereof.

2. Compositions of the general formula

$(CH_3)_3Si(CH_2)_nNH_2(HCl)_s$ in which n has an average value of from 2 to 5, inclusive, and s has a whole value from 0 to 1, inclusive.

3. $(CH_3)_3Si(CH_2)_2NH_2$.
4. $(CH_3)_3Si(CH_2)_2NH_2HCl$.
5. $(CH_3)_3Si(CH_2)_3NH_2$.
6. $(CH_3)_3Si(CH_2)_3NH_2HCl$.

LEO HARRY SOMMER.

(No references cited).